(12) United States Patent
Gnanasambandam et al.

(10) Patent No.: US 9,378,475 B2
(45) Date of Patent: Jun. 28, 2016

(54) APPARATUS AND METHOD FOR CALL CENTER SERVICE LEVEL PREDICTION AND ACTION

(71) Applicant: Xerox Corporation, Norwalk, CT (US)

(72) Inventors: Shanmuga-Nathan Gnanasambandam, Victor, NY (US); Bichen Zheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/555,988

(22) Filed: Nov. 28, 2014

(65) Prior Publication Data

US 2016/0155080 A1    Jun. 2, 2016

(51) Int. Cl.
*H04M 3/00* (2006.01)
*G06Q 10/06* (2012.01)
*H04M 3/51* (2006.01)

(52) U.S. Cl.
CPC ..... *G06Q 10/063112* (2013.01); *H04M 3/5175* (2013.01)

(58) Field of Classification Search
CPC .................................................. H04M 2203/402
USPC ........ 379/265.01–265.14, 266.01–266.1, 309
See application file for complete search history.

(56) References Cited

U.S. PATENT DOCUMENTS

| | | | | |
|---|---|---|---|---|
| 6,928,398 | B1* | 8/2005 | Fang | G06F 17/18 700/30 |
| 7,124,055 | B2* | 10/2006 | Breiman | G06Q 10/06 702/181 |
| 7,251,589 | B1* | 7/2007 | Crowe | G06F 17/18 702/181 |
| 7,478,051 | B2* | 1/2009 | Nourbakhsh | G06Q 10/06 705/7.14 |
| 7,716,022 | B1* | 5/2010 | Park | G06Q 10/10 702/181 |
| 8,015,042 | B2* | 9/2011 | Seetharaman | G06Q 10/06 705/7.12 |
| 2002/0143599 | A1* | 10/2002 | Nourbakhsh | G06Q 10/06 705/7.31 |
| 2002/0184069 | A1* | 12/2002 | Kosiba | G06Q 10/04 705/7.38 |
| 2005/0065837 | A1* | 3/2005 | Kosiba | G06Q 10/04 705/7.13 |
| 2015/0178834 | A1* | 6/2015 | Co | G06Q 40/04 705/37 |

* cited by examiner

*Primary Examiner* — William Deane, Jr.

(57) ABSTRACT

An apparatus, method and non-transitory computer readable medium for predicting a service level of a call center are disclosed. The method performs operations for predicting a service level of a call center. The operations include collecting call data, agent topic skill data, agent skill level data, agent schedule data and agent attrition rate data, building a discrete event simulation model based on the call data, the agent topic skill data, the agent skill level data, the agent schedule data and the agent attrition rate data, predicting the service level of the call center at a future time based on the discrete event simulation model and recommending a number of agents and a skill mix of agents for each queue in the call center at the future time based on the service level that is predicted based on the discrete event simulation model to achieve a call center service objective.

14 Claims, 6 Drawing Sheets

APPARATUS AND METHOD FOR CALL CENTER SERVICE LEVEL PREDICTION AND ACTION

The present disclosure relates generally to improving efficiency of call centers and, more particularly, to an apparatus and method for call center service level prediction and action based on the prediction.

BACKGROUND

Effective management of a call centers necessitates call center managers to balance available human resources with actual or estimated workload. Typically, this type of management is reactive. As a result, if a spike in call volume is experienced at the call center, the call center may not be adequately staffed to handle the sudden spike in call volume or may not have the right skill-mix in the call center.

Alternatively, call center management may be performed on a trial and error basis and/or ad-hoc basis. As a result, cost control for call centers is not guaranteed when managed under these methods.

SUMMARY

According to aspects illustrated herein, there are provided an apparatus, a method and a non-transitory computer readable medium for predicting a service level of a call center. One disclosed feature of the embodiments is an apparatus comprises a processor and a computer readable medium storing a plurality of instructions, which when executed by the processor, cause the processor to perform operations for predicting a service level of a call center. The operations comprise collecting call data, agent topic skill data, agent skill level data, agent schedule data and agent attrition rate data, building a discrete event simulation model based on the call data, the agent topic skill data, the agent skill level data, the agent schedule data and the agent attrition rate data, predicting the service level of the call center at a future time based on the discrete event simulation model and recommending a number of agents and a skill mix of agents for each queue in the call center at the future time based on the service level that is predicted based on the discrete event simulation model to achieve a call center service objective.

Another disclosed feature of the embodiments is a method for predicting a service level of a call center comprising collecting call data, agent topic skill data, agent skill level data, agent schedule data and agent attrition rate data, building a discrete event simulation model based on the call data, the agent topic skill data, the agent skill level data, the agent schedule data and the agent attrition rate data, predicting the service level of the call center at a future time based on the discrete event simulation model and recommending a number of agents and a skill mix of agents for each queue in the call center at the future time based on the service level that is predicted based on the discrete event simulation model to achieve a call center service objective.

Another disclosed feature of the embodiments is a non-transitory computer-readable medium having stored thereon a plurality of instructions, the plurality of instructions including instructions, which when executed by a processor, cause the processor to perform operations comprising collecting call data, agent topic skill data, agent skill level data, agent schedule data and agent attrition rate data, building a discrete event simulation model based on the call data, the agent topic skill data, the agent skill level data, the agent schedule data and the agent attrition rate data, predicting the service level of the call center at a future time based on the discrete event simulation model and recommending a number of agents and a skill mix of agents for each queue in the call center at the future time based on the service level that is predicted based on the discrete event simulation model to achieve a call center service objective.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for predicting a service level of a call center. As discussed above, call centers employ manual management of the call center by managers that apply a reactive analysis. In other words, the mangers typically do not predict a future service level of the call center. In other cases, existing methods may understand that the number of calls are going to change, but may stop short of translating it to the right skill mix of agents at a given queue. This lack of action may produce undesired service levels and/or lead to penalties due to violations in the agreed upon service level.

Some methods for management of a call center use various parameters. However, embodiments of the present disclosure use unique parameters that provide a more accurate prediction of a call center at a future time than currently available methods. Based on the prediction, the apparatus may make a recommendation for proper staffing levels (e.g., proper number of agents per call queue, a proper mix of skills for the agents per call queue, and the like).

Figure 1:
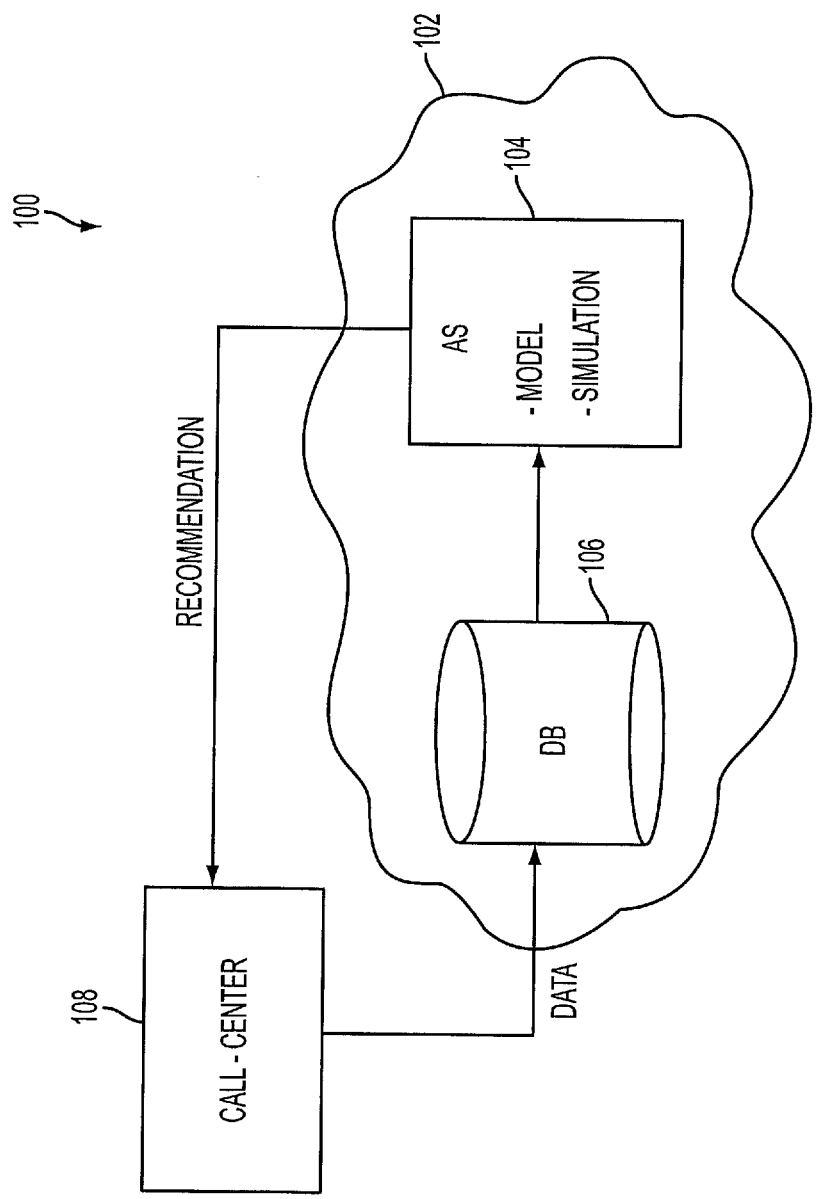
FIG. 1 illustrates one embodiment of a block diagram of a system of the present disclosure.

FIG. 1 illustrates an example system 100 of the present disclosure. In one embodiment, the system 100 includes a communications network 102, an application server (AS) 104 and a database (DB) 106. In one embodiment, the communications network 102 may be any type of communications network including, for example, an Internet Protocol (IP) network, a cellular network, a broadband network, and the like.

In one embodiment, a call center 108 may be in communication with the communication network 102. In one embodiment, the communication network 102 may be located locally within the call center 108. For example, the modeling, simulation and recommendation may be performed and operated by the same entity as the call center 108.

In another embodiment, the communication network 102 may be located remotely from the call center 108. For example, a third party entity may operate and provide call center management services that include the modeling, simulation and recommendation calculated by the AS 104 and sell the services to the call center 108.

It should be noted that the communication network 102 has been simplified for ease of explanation. The communication network 102 may include one or more additional network elements not shown (e.g., firewalls, border elements, routers, switches, and the like). The communication network 102 may also include one or more additional access networks not shown (e.g., a cellular access network, a broadband access network, and the like) between the communication network 102 and the call center 108.

In one embodiment, the call center 108 may receive a plurality of calls related to various types of customer service issues that are fielded by a plurality of agents who are employed at the call center 108. The plurality of agents may each have different skill levels and expertise of one or more different topics that are associated with one or more different queues in the call center 108.

Figure 2:
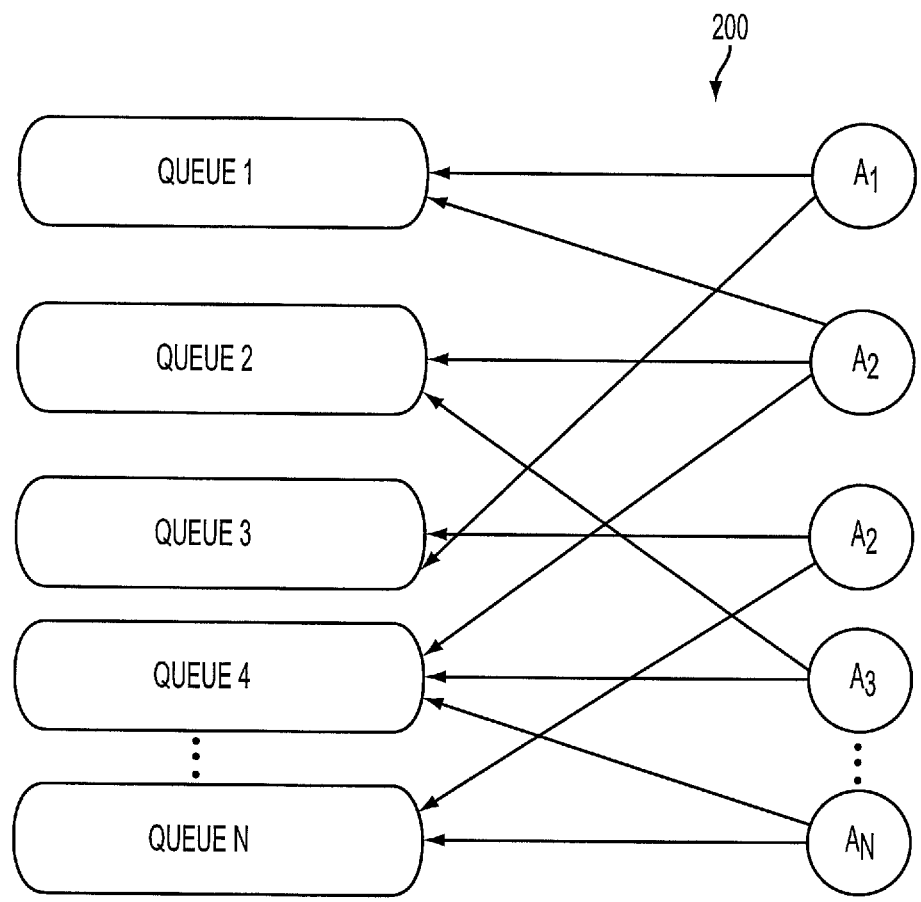
FIG. 2 illustrates one embodiment of an interface of the present disclosure.

FIG. 2 illustrates a high level block diagram 200 of a plurality of queues from 1 to N and a plurality of agents (A) from 1 to N. In one embodiment, each queue may be further divided into a division, one or more programs and one or more tasks. However, the queues in FIG. 2 have been simplified for ease of description. In one embodiment, each one of the 1 to N queues may be associated with a different topic.

In one embodiment, each one of the 1 to N agents may be associated with a different skill set or expertise level associated with the different topics. Based on the topic of each of the queues 1 to N, one or more of the agents 1 to N may be assigned to one or more of the queues 1 to N as illustrated in FIG. 2. In addition, the agents 1 to N may be assigned to one or more of the queues 1 to N based upon expected call volume, time of day, agent scheduling, and the like.

Previously, the assignment of the agents 1 to N to one or more of the queues 1 to N was performed manually by trial and error by a call center manager. Due to the manual assignment, costs could not be guaranteed for various service level agreements (SLA) or call center objectives. Alternately, agents can be assigned by factoring estimated increase or decrease in the number of calls or other types of contact. This ignores the achievable service level factoring overhead, attrition and skills expertise. However, embodiments of the present disclosure provide a computer that has improved functioning by collecting various call center data, including overhead, attrition, skills expertise at the various queues, continuous learning by the agents and future demand, to transform that data into a prediction of a service level of the call center at a future time and provide a recommendation on a number of agents and a skill mix of agents 1 to N for each of the queues 1 to N in the call center.

Referring back to FIG. 1, the DB 106 may collect data from the call center 108 over a period of time. In one embodiment, the different type of data may include a call arrival time for each call, a caller waiting time for each call, a call-handling time for each call, an agent ID that handled each call and an actual call topic of each call.

In one embodiment, the agent ID may be correlated to other information. For example, the agent ID may be correlated to a skill level of the agent that handled the call, a schedule of the agent, a percentage of the week working, when the agent started working at the call center, a number of calls the agent has handled, an average call-handling time of the agent, and the like.

The call arrival time may be the time at which the call was assigned to a queue or when the call came into the interactive voice response (IVR) system. The call arrival time may be used to calculate the time between successive arrivals. The time between successive arrivals may be used in fitting a probability distribution for the inter-arrival times that represent the time between each arrival into the system. Thus, the calls can be generated in the simulation model based on the fitted distribution that is compatible with the underlying data characteristics.

In one embodiment, the caller waiting time is the time between the call arrival to the interactive voice response (IVR) system and the start of conversation between the agent and the caller. The higher the waiting time is on average, the poorer the service quality of the call center is. In one embodiment, the call-handling time is the actual time spent on the conversation between the caller and the agent. The call-handling time may represent the service time that is associated with the phone call, but not including the time related to the work done after the call has ended, i.e., excluding wrap-up time. The actual call topic and the agent ID are combined to measure the average handling time (AHT) for agents on several topics. This measure is used to distinguish the skill levels of different agents. In one embodiment, the 'actual call topic' is represented by the program name and the task type for a certain call center. The topic is usually a hierarchy of various categories of tasks. Table 1 shows examples of the listed definitions.

TABLE 1

Examples of Data Fields of Call Center Simulation Model

| Call Arrival | Waiting Time (min) | Call-Handling Time (min) | Agent ID | Program | Task Type |
|---|---|---|---|---|---|
| Feb. 7, 2014 8:40 | 10 | 7 | AIMA-15HN19 | NCP/CP | General Inquiry |
| Feb. 7, 2014 8:49 | 15 | 13 | AIMA-15HWYX | CCC | Case Status |
| Feb. 7, 2014 9:01 | 5 | 9 | AIMA-15HWXH | SNAP | Change Address |

Once the data is collected, transformations are performed on the data to set up a discrete event simulation model by the AS 104. In one embodiment, the call arrival time may be used to generate a time series that shows a count of calls that occurred in a specific time slot on a specific working day in the call center 108. The time series may have gaps between days if the call center 108 is open for 5 days and 10 hours a day. In one embodiment, the missing values in the time series are substituted with averages to fill the gaps between operating days and operating hours of the time series.

Another transformation that is performed on the data is to build an agent schedule based on the agent ID information. For example, if an agent received a call during a specific time slot, then a "1" is assigned to the time slot to indicate that the agent was working; otherwise a "0" is assigned. For example, the 10 hour day may be split up into 2 hour increments (8:00 AM to 9:59 AM, 10:00 AM-11:59 AM, 12:00 PM-1:59 PM, and so forth). Thus, if an agent received a call at 9:00 AM, then the agent would be assigned a "1" for the time slot of 8:00 AM to 9:59 AM. If the agent did not receive a call between 12:00 PM-1:59 PM, then the agent would be assigned a "0" for the time slot of 12:00 PM-1:59 PM, and so forth.

Another transformation that is performed on the data is to divide the agents into a particular skill level. In one embodiment, the agents may be divided into three different skill levels (e.g., beginner, intermediate and expert). In one embodiment, the agent's average handling time may be obtained based on the agent ID data. Then the average handling time may be compared to a distribution of all handling times of all other agents. In one embodiment, an interval of $[\mu-3\sigma, \mu+3\sigma]$ may be used for determining a skill level of the agent, where $\mu$ is an average of all handling times of all other agents and $\sigma$ is a standard deviation of the call handling times. Thus, if the average handling time of the agent is below $\mu-3\sigma$ the agent may have an expert skill level (e.g., the agent's average call handling time is below average or faster than other agents), if the average handling time of the agent is between $[\mu-3\sigma, \mu+3\sigma]$ then the agent may have an intermediate skill level, and if the average handling time of the agent is above $\mu+3\sigma$, then the agent may have a beginner skill level (e.g., the agent's average call handling time is above average or slower than other agents).

In one embodiment, the data transformed into the agent schedule and the agent skill level may be compiled into a chart that lists each agent with a marker for each time period on each day that the agent was working for a particular topic of a queue. In addition, each marker may be color coded to indicate whether the agent was a beginner, an intermediate or an expert for the particular topic of the queue.

Another transformation that is performed on the data is to calculate an attrition rate estimate for the call center 108. For example, based on the agent ID, the date the agent began working at the call center 108 and the date the agent left the call center 108 can be obtained. The attrition rate estimate may be calculated as a percentage of agents who quit after a certain period of time. The percentage may be calculated based on a weekly time period, a monthly time period, a yearly time period, and the like.

In one embodiment, previous methods did not account for agent scheduling and attrition rate estimates to perform a simulation model of the service level of the call center 108 at a future time. However, attrition rate in call centers can be quite high and may be an important factor that can impact staffing. Thus, previous models may make a prediction on a future service level based on assumptions in staffing that may not change in the future, resulting in an inaccurate prediction and inaccurate recommendations. The embodiments of the present disclosure anticipates the changes in the number of agents due to attrition, the schedule of the agents, and the like, to accurately predict the service level of the call center in the future. Since the predictions are more accurate, the recommendations will also be more accurate.

Another transformation that is performed on the data is to fit a distribution to one or more of the data. For example, a distribution may be fitted to the inter-arrival time between calls calculated from the call arrival time for each call that is collected, the call-handling time for each call that is collected and an overhead time that is calculated based upon an agent's inter-arrival time that can be calculated based on the call arrival time for each agent ID.

In one embodiment, the inter-arrival time between calls may also include a topic frequency. The topic frequency may be a count of how many calls arrive for a particular topic. The average call handling times may also be calculated based on each topic of a plurality of different topics associated with each one of the different queues.

The topic frequency may also be used to aid in calculating an empirical probability for each call topic. In one embodiment, the empirical probability can be calculated for different periods of time. For example, if the actual call volume of different topics in one day is 3000 calls and the number of calls of one topic is 500 calls, then the empirical probability of this topic is 16.6% (e.g., 500/3000). The empirical probability may be used by the simulation model to assign a topic to a simulated arriving call.

In one embodiment, the overhead time may include time taken for breaks, other assigned tasks or time wasted by idleness by an agent. The other assigned tasks may include tasks, such as for example, replying to emails, web chatting, writing notes about a specific caller, and the like. Currently, no data exists on the time associated with performing the tasks between arriving calls. However, one embodiment of the present disclosure may track and collect data related to approved overhead time associated with each agent to provide a more accurate simulation model of the call center 108.

In one embodiment, a parameter, $p_w$, may be introduced that represents a percentage of idle time or wasted time between consecutive calls (e.g., the overhead time) for an agent w. If $\Delta t$ represents a time between consecutive calls for the agent w, then $(1-p_w)\Delta t$ may be a time duration that is a part of agent w's overhead distribution, and $p_w\Delta t$ may represent the idleness of this agent w.

In one embodiment, the distribution may be fitted over a particular time period. For example, the distribution may be fitted over a weekly time period, a monthly time period, a yearly time period, and the like.

In one embodiment, the distribution type may be different based on amount of data that is available. For example, if there is only a single datum (x), a uniform distribution may be generated on the interval [0.8x, 1.2x]. If the number of data points is between 1 and 49 inclusive, then an empirical distribution may be used. If the number of data points is greater than 50, then the maximum likelihood may be estimated for 12 different distributions including Lognormal, Normal, Beta, Gamma, Weibull, Exponential, Erlang, Pearson VI, Inverse Gamma, Pareto, Frechet and Gumbel.

In one embodiment, the goodness of the fitted distribution at significance level $\alpha$, is calculated by the use of the Kolmogorov-Smirnov test of significance. If the smallest p-value among the 12 significance tests is less than $\alpha$, then the fitted parameters from the corresponding distribution are used. Otherwise, the fitted distribution defaults back to the empirical distribution.

Once all the data collected in the DB 106 is transformed and processed by the AS 104, the AS 104 may build a discrete event simulation model based on the data. For example, after preparing the time series, building the agent profile and agent skill levels, finding the various estimates and fitting the distributions, the discrete event simulation model may be built and run. In one embodiment, the forecasted call volume and topic may also be input into the simulation model.

In one embodiment, the simulation model simulates multiple days over a given time period, which is based on the probability distributions that are fitted to the historical data. For any specific day, the simulation first generates call arrivals based on the forecasted call volume, inter-arrival time distributions, and the relative frequency of topics. Then, the agent schedule is assigned within the simulation based on the empirically inferred agent work schedules from that day. The inferred schedules of the agents in the simulation are based on the timestamps at which agents are known to have handled calls.

In one embodiment, one of the parameters of the simulation model is the Num-Periods, which is set to 10 periods to indicate the 10 working hours in a day from 8:00 am to 6:00 pm. Any calls received after 6:00 pm are considered as outbound calls that are truncated while running the simulation. Moreover, another parameter is Num-Working-Days, which is set to 5 days to indicate the 5 business days of the work week. The inferred schedule of an agent is a binary array of length 10 where "1" indicates that the agent is assigned to work in this given period. Training may be required in certain topics and queries, and by examining the traces of the data, the agent profiles can be inferred. If the agent answered a call topic in a certain period, this not only indicates that the agent was available in this time slot, but also that he/she has the skill to answer this type of topic. The topic the agent answers is added to the list of topics that they can work on.

Another parameter in the simulation is the number of replications. A replication allows the simulation to repeat itself consecutively for a specified number of times. In order to approach a distribution by means of simulation, the number of replications may be determined where the accuracy with which the distribution is calculated will depend on the selected number of replications. The aim of running the simulation multiple times is to obtain better estimates of the mean performance. In one embodiment, the parameter of the number of replications for the discrete event simulation model is set to 10 replications, however, it can be adjusted to any other number.

In one embodiment, the discrete event simulation model may have three different operating modes of: a replay mode, a prediction mode and a generation mode. In other words, the discrete event simulation model may have additional modes other than the generation mode used for simulating and predicting the service level based on historical data to recommend a number of agents and a skill mix of agents for each queue in the call center 108. In one embodiment, the replay mode may use the actual data for call arrivals, queue routing, agent selection and call handling. The replay mode may be used to replay and analyze actual events of the call center 108.

In one embodiment, the prediction mode may use actual call arrival times from the historical data. However, the topic predictions may be used to route the calls. The selection of the agent and the queue may be based on the predicted call topic for the calls. Certain calls may have no predictions and may be routed to the actual historical queues, but not necessarily the historical agent. Thus, the routing may be a combination of strategic and actual routing. The call-handling times may be generated based on the distributions that were fitted, as discussed above.

In one embodiment, the generation mode may use the call arrival times that are generated from the inter-arrival distribution that were fitted, as discussed above. In the generation mode, the topic of each generated call arrival is assigned based on the empirical probability of each topic that is calculated as discussed above. The call may then be routed based on the assigned topic and the current routing strategy used (e.g., shortest queue, expert agent selection-most idle agent (EAS-MIA), and the like). The call-handling times may be generated by the simulation based on the distributions that were fitted, as discussed above. Table 2 illustrates a summary of the modes of the discrete event simulation model.

TABLE 2

Simulation Running Modes

| | Call Arrivals | Queue Routing | Agent Selection | Call-Handling (Service) |
|---|---|---|---|---|
| Replay | Actual | Actual | Actual | Actual |
| Prediction | Actual | Actual + Strategy | Strategy | Generated |
| Generation | Generated | Strategy | Strategy | Generated |

Thus, the discrete event simulation model built by the AS 104 may be used to also train agents by reviewing past events (e.g., using replay mode) as well as providing accurate predictions to guarantee costs for service level agreements or achieving a particular call center objective (e.g., average call handling times below a threshold level, average call wait times below a threshold level, and the like). Such training may be used to estimate the level of learning of the agent, and subsequently used by the discrete event simulation model to record continuous skills improvement on part of the agent.

Figure 3A:
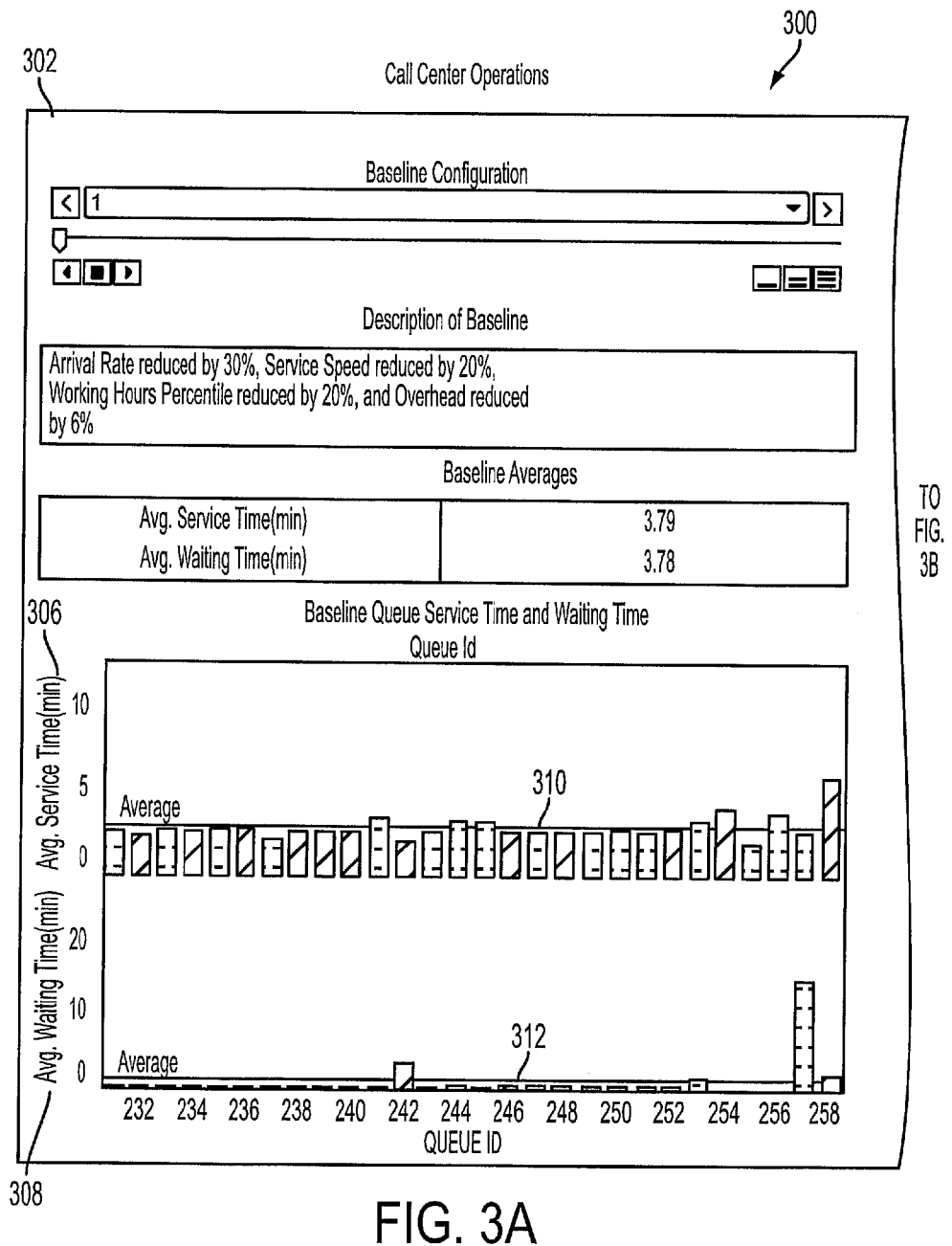
FIGS. 3A and 3B illustrate an example of a baseline service level and a predicted service level after running a discrete event simulation model.
Figure 3B:
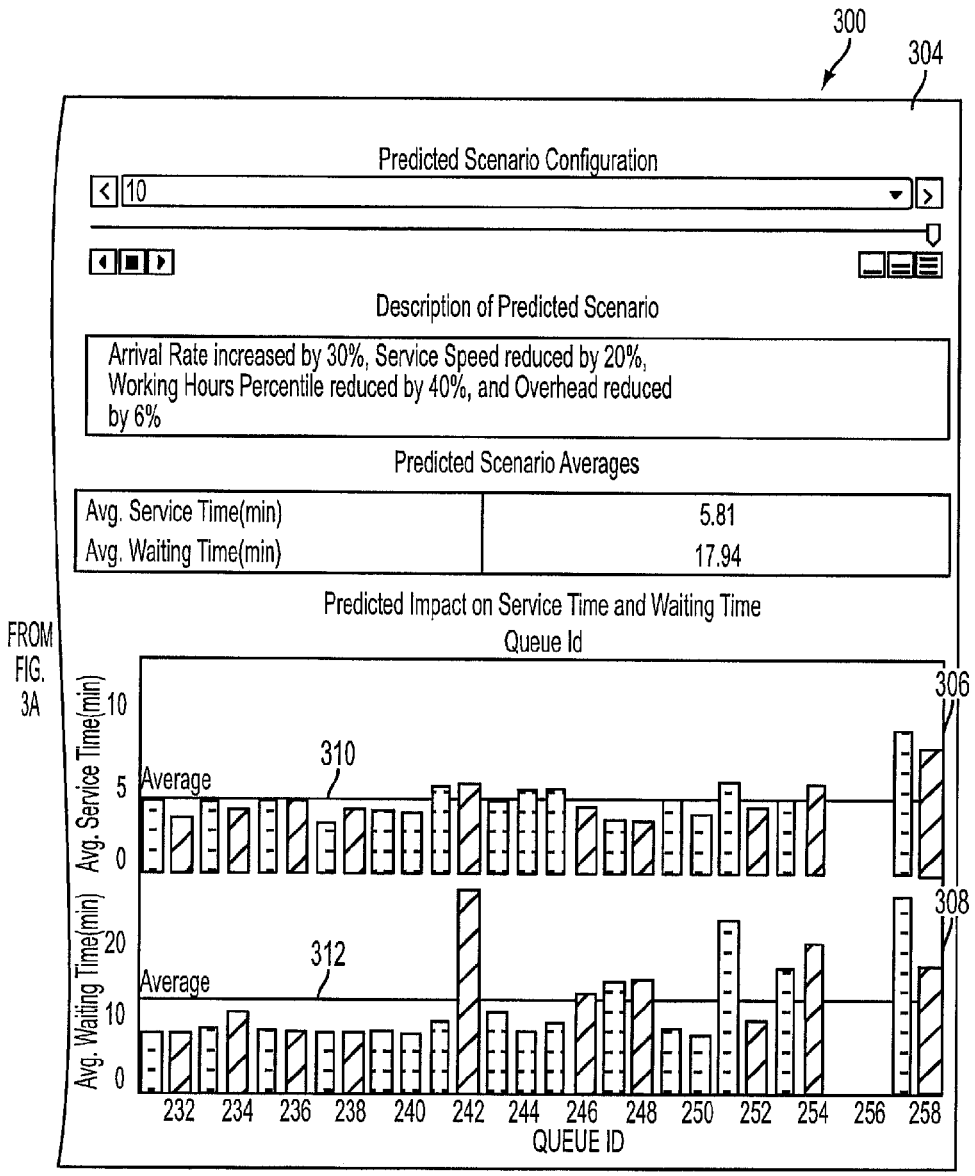

FIGS. 3A and 3B illustrate a graph 300 that illustrates a baseline service level 302 and a predicted service level 304 after running the discrete event simulation model. The graph 300 may include a bar chart for each queue ID (e.g., different queues each having different topics). The graph 300 may include an average waiting time 308 and an average service time 306 for each queue. A line 310 and a line 312 may be illustrated that represents an average for service time and waiting time, respectively, over all queues.

In one embodiment, based on a predicted call volume at a future time and a reduction in working hours, the discrete event simulation model may use the data collected, as discussed above, to simulate the call center environment. The results are illustrated in the predicted service level 304. Notably, the average service time 306 and the average waiting time 308 increase for each queue when compared to the baseline service level 302. Notably, the discrete event simulation model of the present disclosure makes an accurate prediction for the overall service time and waiting time of the call center over all queues, as well as a more granular prediction of each individual queue.

Using the predictions from the simulated model, the AS running the discrete event simulation model may then make accurate recommendations regarding a number of agents and a skill mix of the agents for the call center and for each queue in the call center at the future time. For example, the queue 242 may be expected to experience a large jump in average wait time that may violate a service level agreement. As a result, the AS may recommend adding a particular number of agents to queue 242 based on the agents schedule, experience, and skill level that match the topic of the queue 242. A similar recommendation may be made for each other queue in the call center to reduce the average service time 306 and average waiting time 308 to a level below a service level agreement. In other words, the recommendation will ensure that the overall service level of the call center is within an objective or within a service level agreement. In addition, the recommendation will ensure that each queue is also within the objective or within the service level agreement.

Figure 4:
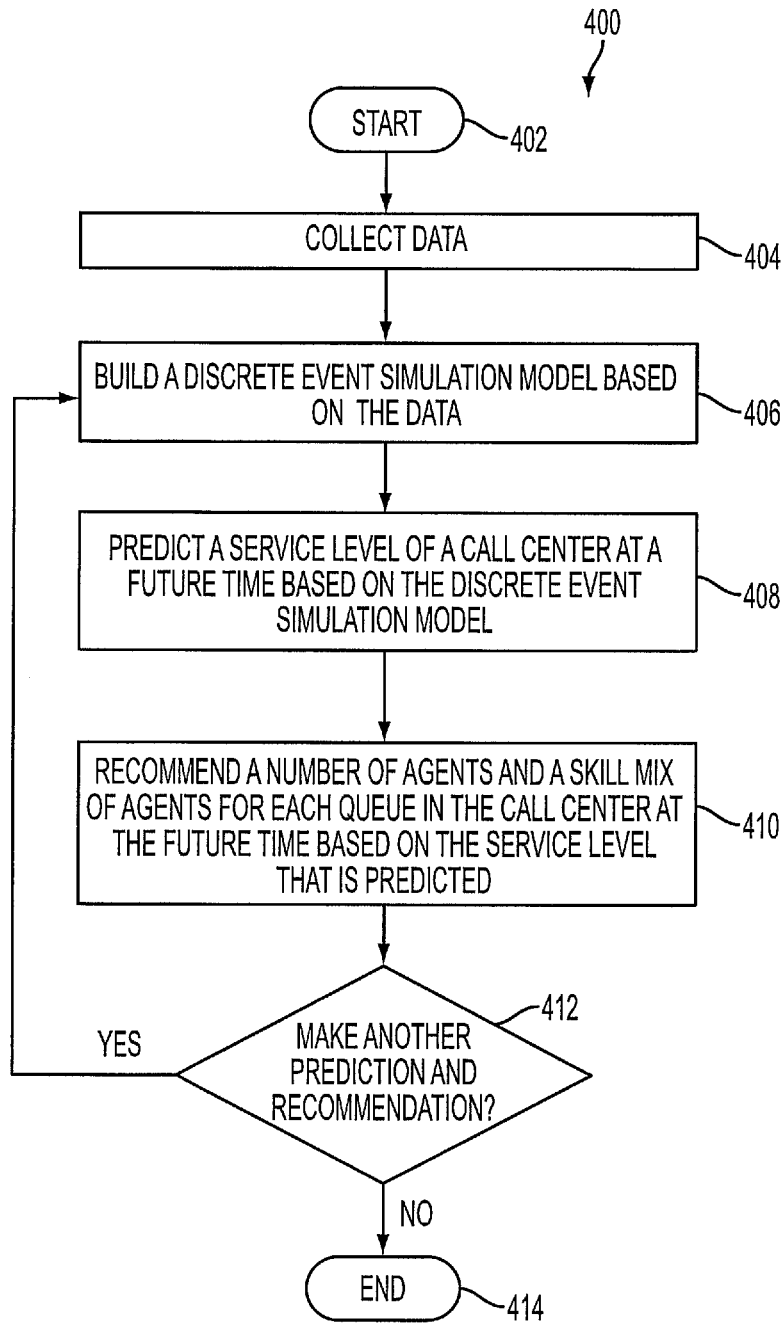
FIG. 4 illustrates a flowchart of one embodiment of a method for predicting a service level of a call center.
Figure 5:
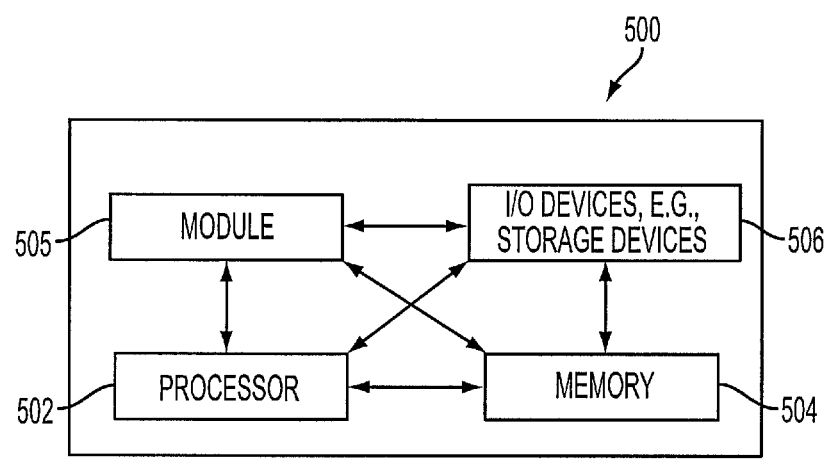
FIG. 5 illustrates a high-level block diagram of a computer suitable for use in performing the functions described herein.

FIG. 4 illustrates a flowchart of a method 400 for predicting a service level of a call center. In one embodiment, one or more steps or operations of the method 400 may be performed by the AS 104 or a computer as illustrated in FIG. 5 and discussed below.

At step 402 the method 400 begins. At step 404, the method 400 collects data. For example, the data may include a call arrival time for each call, a caller waiting time for each call, a call-handling time for each call, an agent ID that handled each call and an actual call topic of each call. In one embodiment, the agent ID may be correlated to other information. For example, the agent ID may be correlated to a skill level of the agent that handled the call, a schedule of the agent, a percentage of the week working, when the agent started working at the call center, a number of calls the agent has handled, an average call-handling time of the agent, and the like. The additional agent data correlated from the agent ID may be used to calculate the agent schedule data and agent attrition rate data.

In one embodiment, the data may be further transformed to calculate data for a topic of each call. For example, an expected call-handling time based on each topic and a frequency of each topic may be calculated. The calculated data for each topic may be used by the discrete event simulation model to further predict a service level for each topic of each queue for recommending a number of agents and a skill mix of agents for each topic of each queue as well as the overall call center.

At step 406, the method 400 builds a discrete event simulation model based on the data. In one embodiment, transformations may be performed on the various different data that is collected. For example, gaps in data may be filled in (e.g., a time series calculated from the arrival time of each call), distributions may be fitted to the data, categorizing the data (e.g., dividing the agents into a particular group of skill level), and the like.

At step 408, the method 400 predicts a service level of a call center at a future time based on the discrete event. For example, the discrete event simulation model may simulate the call center at a future time based on an expected volume of calls at the future time. The discrete event simulation model may predict how calls will be routed, which topic queues the calls will be routed to, which agents will be assigned to the calls, the average handling time for each call, and the like.

In one embodiment, the discrete event simulation model may predict a service level for each one of a plurality of different topic queues in addition to an overall service level of the call center. In other words, the discrete event simulation model may be used to "right size" the queues.

At step 410, the method 400 recommends a number of agents and a skill mix of agents for each queue in the call center at the future time based on the service level that is predicted. For example, based on the simulation recommendation may be provided to the call center such that each queue in the call center may be properly staffed by a proper number of agents and a proper skill mix of agents to achieve a call center service objective. For example, the call center service objective may be to have an average handling time of each call be below a threshold (e.g., below 5 minutes), to have an average wait time for each call be below a threshold (e.g., below 90 seconds), and the like. Other examples of service level agreements could be 80% of the calls are processed in under 3 minutes, 99% of the calls are processed in under 5 minutes, and so forth. Both cases can refer to either call handling time or a combination of call waiting time and call handling time.

At step 412, the method 400 determines whether another prediction and recommendation are needed. If the answer is yes, the method 400 returns to step 406 to repeat steps 406-412. However, if the answer is no, the method 400 proceeds to step 414. At step 414, the method 400 ends.

As a result, the embodiments of the present disclosure improve the functioning of an application server or a computer. For example, the computer may be improved with a capability of predicting a future service level of call centers using previously unused parameters that could not otherwise be performed by the computer without the improvements provided by the present disclosure. In other words, the technological art of call centers are improved by providing a computer that is modified with the ability to predict future service levels of call centers, as disclosed by the present disclosure.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a computer that can be transformed to into a machine that is dedicated to perform the functions described herein. Notably, no computer or machine currently exists that performs the functions as described herein. As a result, the embodiments of the present disclosure improve the efficient operation of call centers, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 predicting a service level of a call center, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for predicting a service level of a call center (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for predicting a service level of a call center (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An application server for predicting a service level of a call center, comprising:
   a processor; and
   a non-transitory computer-readable medium storing a plurality of instructions, which when executed by the processor, cause the processor to perform operations, the operations comprising:
   collecting call data, agent topic skill data, agent skill level data, agent schedule data and agent attrition rate data;
   building a discrete event simulation model based on the call data, the agent topic skill data, the agent skill level data, the agent schedule data, the agent attrition rate data and an overhead of each agent of the call center, wherein the overhead comprises a percentage of an idle time between consecutive calls;
   executing the discrete event simulation model to predict the service level of the call center at a future time, wherein the service level that is predicted comprises a prediction of the service level for each one of a plurality of different topic queues;
   generating a graph that displays a call volume per topic queue of the plurality of different topic queues that is predicted; and
   transmitting a recommendation to the call center, wherein the recommendation comprises a number of agents and a skill mix of agents for each queue in the call center at the future time based on the service level that is predicted based on the graph generated by the discrete event simulation model to achieve a call center service objective.

2. The application server of claim 1, wherein the call data for each call comprises a number of calls, a call arrival time, a caller waiting time and a call handling time.

3. The application server of claim 2, further comprising:
   creating a time series of the number of calls that is cleaned up by including an average of the number of calls for missing values within the time series.

4. The application server of claim 1, wherein the agent skill level data is determined based on an average service time of the agent relative to average service times of all other agents.

5. The application server of claim 1, wherein the agent attrition rate data comprises a percentage of agents that will quit at a particular time based on a number of agents that quit after a certain period of time.

6. The application server of claim 1, wherein the discrete event simulation model comprises a replay mode, a prediction mode and a generation mode.

7. A method for predicting a service level of a call center, comprising:
   collecting, by a processor of an application server, call data, agent topic skill data, agent skill level data, agent schedule data and agent attrition rate data;
   building, by the processor of the application server, a discrete event simulation model based on the call data, the agent topic skill data, the agent skill level data, the agent schedule data and the agent attrition rate data and an overhead of each agent of the call center, wherein the overhead comprises a percentage of an idle time between consecutive calls;
   executing, by the processor of the application server, the discrete event simulation model to predict the service level of the call center at a future time, wherein the service level that is predicted comprises a prediction of the service level for each one of a plurality of different topic queues;
   generating a graph that displays a call volume per topic queue of the plurality of different topic queues that is predicted; and
   transmitting, by the processor of the application server, a recommendation to the call center, wherein the recommendation comprises a number of agents and a skill mix of agents for each queue in the call center at the future time based on the service level that is predicted based on the graph generated by the discrete event simulation model to achieve a call center service objective.

8. The method of claim 7, wherein the call data for each call comprises a number of calls, a call arrival time, a caller waiting time and a call handling time.

9. The method of claim 8, further comprising:
   creating a time series of the number of calls that is cleaned up by including an average of the number of calls for missing values within the time series.

10. The method of claim 7, wherein the agent skill level data is determined based on an average service time of the agent relative to average service times of all other agents.

11. The method of claim 7, wherein the agent attrition rate data comprises a percentage of agents that will quit at a particular time based on a number of agents that quit after a certain period of time.

12. The method of claim 7, wherein the discrete event simulation model comprises a replay mode, a prediction mode and a generation mode.

13. A method for predicting a service level of a call center, comprising:
   generating, by a processor of an application server, a time series of a number of calls in each one of a plurality of different time slots;
   calculating, by the processor of the application server, a skill level of each agent of a plurality of agents;
   calculating, by the processor of the application server, an attrition rate of the plurality of agents;
   fitting, by the processor of the application server, a distribution to an inter-arrival time between calls, a call-handling time and an overhead, wherein the overhead comprises a percentage of an idle time between consecutive calls;

calculating, by the processor of the application server, an expected call-handling time based on each topic of a plurality of different topic queues;

calculating, by the processor of the application server, a frequency of the each topic of a plurality of topics of the plurality of different topic queues;

building, by the processor of the application server, a discrete event simulation model based on the time series of the number of calls, the skill level of the each agent of the plurality of agents, the attrition rate, the distribution of the inter-arrival time between calls, the call-handling time and the overhead, the expected call-handling time based on the each topic of the plurality of topics and the frequency of the each topic of the plurality of topics;

executing, by the processor of the application server, the discrete event simulation model to predict the service level of the call center at a future time, wherein the service level that is predicted comprises a prediction of the service level for each one of the plurality of different topic queues;

generating a graph that displays a call volume per topic queue of the plurality of different topic queues that is predicted; and transmitting, by the processor of the application server, a recommendation to the call center, wherein the recommendation comprises a number of agents and a skill mix of agents for each topic queue of the plurality of different topic queues in the call center at the future time based on the service level that is predicted based on the graph generated by the discrete event simulation model to achieve a call center service objective.

14. The method of claim 13, wherein the discrete event simulation model comprises a replay mode, a prediction mode and a generation mode.

\* \* \* \* \*